(12) United States Patent
Daney De Marcillac et al.

(10) Patent No.: US 11,714,141 B2
(45) Date of Patent: Aug. 1, 2023

(54) STATUS OF DEVICE CONNECTIONS

(71) Applicant: Hewlett-Packard Development Company, L.P., Spring, TX (US)

(72) Inventors: Patrick Jacques Andre Marie Daney De Marcillac, Grenoble (FR); Sandro Secci, Grenoble (FR); Rudolf Wegener, Grenoble (FR); Jack Yeh, Taipei (TW); Joshua Serratelli Schiffman, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 14 days.

(21) Appl. No.: 17/445,527

(22) Filed: Aug. 20, 2021

(65) Prior Publication Data

US 2022/0057459 A1    Feb. 24, 2022

(30) Foreign Application Priority Data

Aug. 21, 2020   (EP) ..................................... 20305944

(51) Int. Cl.
    *G01R 31/66*    (2020.01)
(52) U.S. Cl.
    CPC ..................... *G01R 31/66* (2020.01)
(58) Field of Classification Search
    CPC . G01R 31/66; G06F 11/3027; G06F 11/3041; G06F 11/3055; G06F 13/382; G06F 13/4068; G06F 13/4072; G06F 11/3051; H04L 43/0811; H04L 43/0817; H04L 63/08
    See application file for complete search history.

(56) References Cited

U.S. PATENT DOCUMENTS

| | | | |
|---|---|---|---|
| 7,352,289 B1 | 4/2008 | Harris | |
| 8,509,422 B2* | 8/2013 | Wang | H04M 19/001 340/333 |
| 2004/0199342 A1 | 10/2004 | Graves | |
| 2006/0034449 A1* | 2/2006 | Joerger | H04M 9/08 379/413 |
| 2011/0283129 A1* | 11/2011 | Guillerm | H04N 21/42204 713/340 |
| 2014/0156879 A1 | 6/2014 | Wong et al. | |
| 2015/0008938 A1 | 1/2015 | Kim | |

(Continued)

FOREIGN PATENT DOCUMENTS

CN   108051696 A   5/2018

OTHER PUBLICATIONS

Washiro, Takanori, "Applications of RFID over power line for Smart Grid", 2012 IEEE International Symposium on Power Line Communications and Its Applications, Mar. 27, 2012, pp. 83-87.

*Primary Examiner* — Akm Zakaria
(74) *Attorney, Agent, or Firm* — Knobbe, Martens, Olson & Bear, LLP (57) ABSTRACT

A method for determining a connection status of a device to a cable within a network environment is provided. The method comprises obtaining a signal from a non-data carrying wire of the cable by a detector that is digitally isolated from data transmitted in a data carrying wire of the cable within the network environment, modifying the signal transmitted by the non-data carrying wire to the device and evaluating the modified signal to determine a connection status of the device to the cable.

13 Claims, 5 Drawing Sheets

(56) References Cited

U.S. PATENT DOCUMENTS

2016/0124477 A1    5/2016  Guy et al.
2016/0154048 A1*  6/2016  Lee ........................ H01R 29/00
                                                                          439/620.21
2018/0048097 A1    2/2018  Misgen \* cited by examiner

STATUS OF DEVICE CONNECTIONS

BACKGROUND

Networks and networked systems may comprise many thousands of individual interconnected devices and cables. Each device within a network may have multiple different types of connection interfaces. The status of connections is an integral part of network management. Engineers may physically inspect connections between cables and device to determine the status of a connection. In some cases the health of a connection may also be analysed. This may include performing tests and checks to identify any faults in connections and determine if components are operating as expected.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Networks and networked systems may comprise thousands of individual interconnected devices and cables. In many circumstances it is possible for an engineer to physically inspect a connection between a cable and a device to determine a connection status. In other circumstances, for example, where a connection assessment is performed by an agent that is physically remote from the connection with limited or no visibility to it, determining the connection status and health of a connection becomes more complicated.

Performing a connection assessment becomes even more challenging when the agent works from outside of a network environment that is protected by a firewall, since the firewall may digitally hide the connection status. Access to information that is protected behind a firewall may be strictly limited and the processes for providing access rights are often complex and rigid. These rigorous protections complicate otherwise simple tasks, where a very small set of data collected from within the firewall would suffice to diagnose and fix a problem.

It is technically possible that a limited set of data may be provided from behind the firewall through an independent communication path such as a cellular modem or independent network connection. However, for security reasons it is also unlikely that devices behind a firewall will have access to an independent communication path. Even when one is provided, reception may be poor or prohibitively expensive to use and maintain.

Alternatively two network cards controlled by the same end-point system may be provided such that a limited amount of information may be communicated to an agent in relation to a connection. In that case the end-point system participates in the enforcement of firewall rules. A network card is expensive and the management of firewalls rules on many end-user endpoints increases complexity and introduces potential security risks.

The methods and apparatus described herein may be used to remotely assess the connection status and health status of a connection of a device to a cable in a network environment. The methods and apparatus exploit information which is available, for example, via the non-data carrying wires within a cable, to efficiently extract the connection status of a device. In examples, the apparatus digitally sits outside the network environment that contains the cable. As such, the apparatus is able to readily determine the connection status of a device to a cable where data that is communicated through the connection is protected behind a firewall.

The apparatus uses wires in the cable in order to transmit some information of its own. For example, the apparatus may be arranged to open and close a connection with a device through the cable as part of a health assessment of a connection using a modified signal. The assessment of the presence and status of a device at one or both ends of a cable may then be communicated to an agent outside of the network environment. Furthermore the apparatus may be a very low power consumption device. As such, in some examples the apparatus is powered using power from wires it couples with in the cable, when available.

Herein, a network environment is a network of interconnected nodes arranged to communicate data to one another. A cable connecting two nodes of the network is said to transmit data within the network environment. A device may be described as being digitally isolated from data transmitted by a cable that transmits data within the network environment when unfiltered data transmitted by the cable within the network environment is inaccessible to the device. According to examples, a network environment may comprise a firewall which defines the perimeter of the network environment. A firewall may be defined by a set of firewall rules which permit a limited set of data to be communicated between the network environment and devices outside of the network environment.

Figure 1:
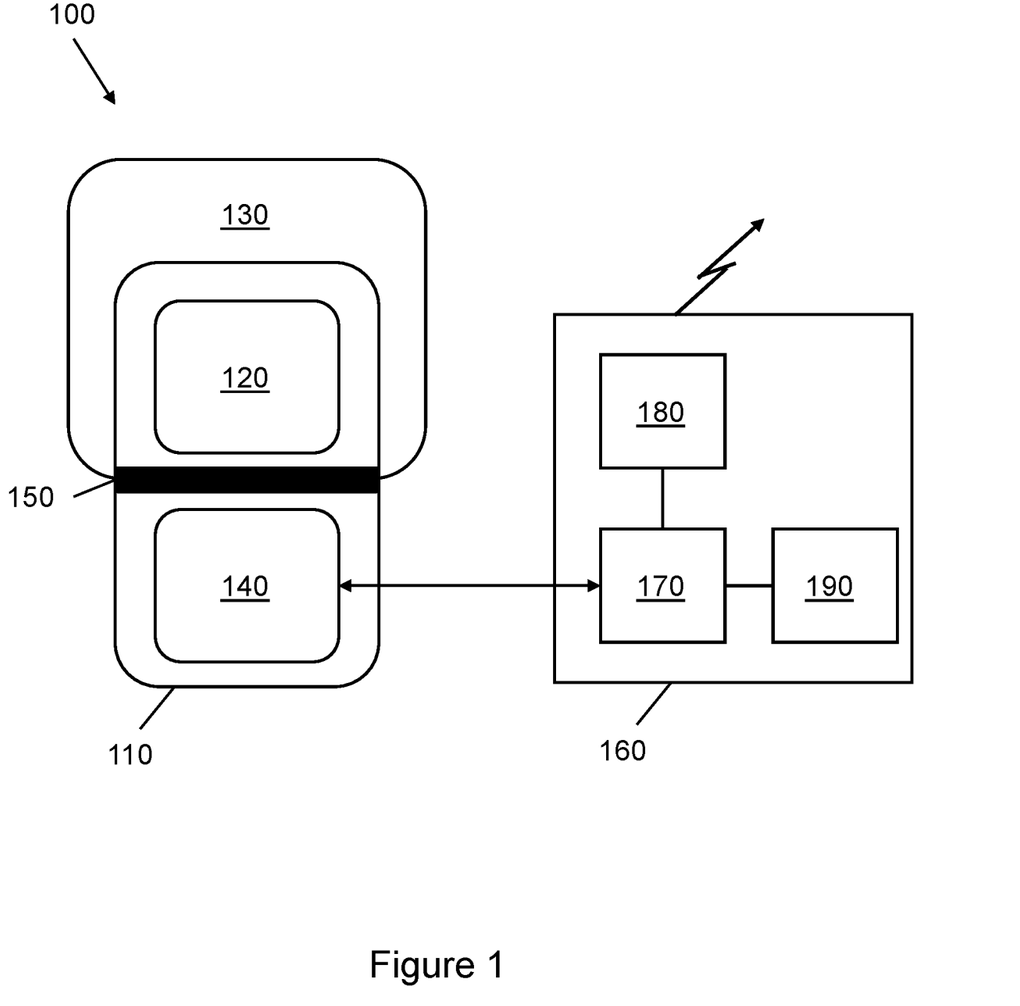
FIG. 1 is a schematic diagram showing an apparatus for analysing a connection of a cable to a device, according to an example.

FIG. 1 shows a schematic diagram of an apparatus 100 for analysing a connection of a cable to a device within a network environment, according to an example. The apparatus 100 comprises a cable 110. The cable 110, shown in FIG. 1 in side profile, comprises a data-carrying wire 120 that is arranged to communicate data to a device (not shown in FIG. 1) within a network environment 130.

According to examples described herein, the cable 110 may connect to devices within the network environment 130 at one or both ends of the cable 110 at a connection interface. In the former case, the cable may be connected at another end to a device in a second network environment distinct from the network environment 130. In examples the cable is a Thunderbolt Universal Serial Bus (USB) cable, a monitor cable connecting to a display port, a High-Definition Multimedia Interface (HDMI) cable or a direct current (DC)-in cable.

In the apparatus shown in FIG. 1, the cable 110 comprises a non-data carrying wire 140 distinct from the data-carrying wire 120. The non-data carrying wire 140 may be, for example, a power-carrying wire which does not transmit any data within the network environment 130. In FIG. 1, a firewall 150 represented by a thickened line between the data carrying wire 120 and non-data carrying wire 140 separates the network environment 130 and data-carrying wire 120 from the non-data carrying wire 140.

The apparatus 100 shown in FIG. 1 comprises a signal detector 160. The signal detector 160 may be a self-contained hardware device. In other cases, the signal detector 160 may be implemented in software or firmware. The signal detector 160 comprises a detection module 170, a signal generator 180 and a signal processor 190 that are communicatively coupled to the detection module 170. The signal detector 160 is digitally isolated from data transmitted by the cable 110 within the network environment.

In the example shown in FIG. 1, the detection module 170 obtains a signal from the non-data carrying wire from outside of the network environment. According to examples, where the non-data carrying wire carries power to the device within the network environment 130, the signal that is obtained by the detection module 170 may be a power signal. In that case, the signal detector 160 may itself be powered by the power signal received by the detection module 170.

The signal generator 180 generates a modified signal based on the signal obtained by the detection module 170 and transmits the modified signal in the non-data carrying wire 140. According to examples, this may be done in a way which is compliant with device standards and/or rules associated to the network environment 130. The modified signal may be generated to open and close the connection of the cable 110 to the device in the network environment 130.

The signal processor 190 is arranged to evaluate the modified signal that is received by the detection module 170 and determine a connections status of a device to the cable 110 within the network environment on the basis of the modified signal. A connection status of a device to the cable 110 may comprise a single bit value indicating whether the device is connected or not connected to the cable and/or is receiving data within the network environment 130 from the cable 110.

According to examples, where the intercepted signal is a power signal, the signal processor 190 may be arranged to compare the modified signal to a pre-determined power characteristic associated to the device to determine the connection status. A pre-determined power characteristic may comprise a power signal that is expected of a device operating according to a standard or a known tolerance of the device.

The signal detector 160 may further be arranged to transmit the connection status that is ascertained from the signal to a device or agent operating in a network environment outside of the network environment 130. This allows an agent to determine the connection status of the device within the network environment 130 from outside of the firewall 150 and without interfering with any data transport protocol of the network environment 130.

In some cases, in addition to determining a binary 1/0 representing the connection status of the device to the cable, the signal detector 160 may further be able to determine a health status of the connection. A health status may comprise information indicating a quality of a connection, or whether the device is connected with an issue. For example, where the connection is a display port, if voltages are not at the expected levels and tolerances as per the display port standard, a health status of the computer connecting to the display may be derived as a function of the observed voltages. A voltage level that is far in excess of an expected tolerance may indicate that the display port power management on the computer is defective. This information may be transmitted by the signal detector 160 to an agent for remote diagnosis.

According to examples, the signal detector 160 comprises an authentication module (not shown in FIG. 1). In some cases the authentication module is communicatively coupled to the signal generator 180. The authentication module authenticates the signal detector 160 to a device in the network environment 130 by executing an authentication protocol in the non-data carrying wire 140 with the device. In some cases, this is performed using a modified signal generated by the signal generator 180 and controlled by the authentication module.

According to examples the authentication module is further arranged to authenticate the information transmitted by the signal detector 160 to an agent outside of the network environment 130. For example, the authentication module may digitally sign the connection status that is ascertained from a signal prior to transmitting it to the agent using a cryptographic signature protocol. The signature is then verified by the agent.

Figure 2A:
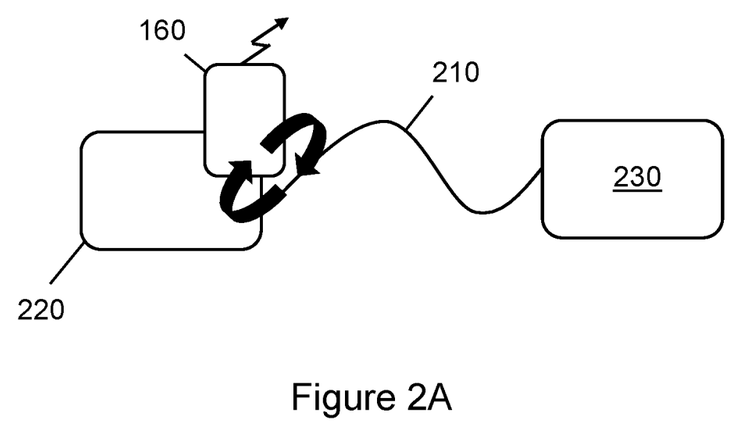
FIG. 2A is a schematic diagram showing an arrangement of the apparatus for analysing a connection, according to an example.
Figure 2B:
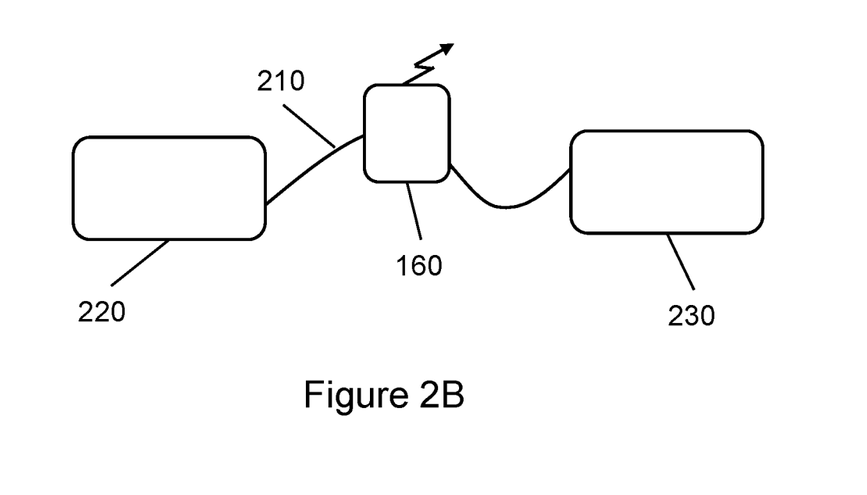
FIG. 2B is a schematic diagram showing an arrangement of the apparatus for analysing a connection, according to a further example.
Figure 2C:
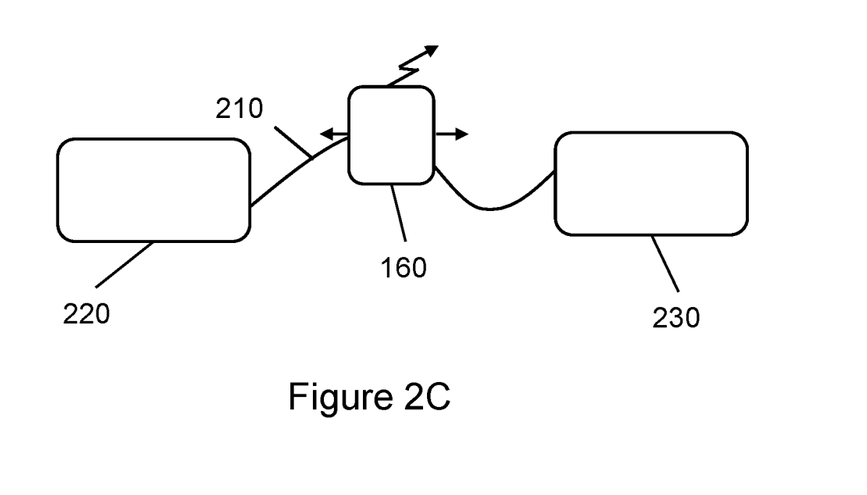
FIG. 2C is a schematic diagram showing an arrangement of the apparatus for analysing a connection, according to a further example.

FIGS. 2A to 2C show schematic diagrams of examples of setups for the signal detector 160, shown in FIG. 1. In each of FIGS. 2A to 2C a cable 210 connects a device 220 to a device 230. The device 230 is located within a network environment and the cable 210 communicates data on a data-carrying wire within the network environment to the device 220, possibly through a firewall. The device 220 may or may not reside in the same network environment as the device 230.

FIG. 2A shows a first example in which the signal detector 160 is integrated within the device 220. In FIG. 2A, the signal detector 160 actively modifies the signal and may assess the connection and health status of the devices 220 and 230 on the basis of the modified signal. This may be done in a systematic way: first an assessment is done on the device 220 and then an assessment is done on the connection for the device 230.

FIG. 2B shows a second example in which the signal detector 160 is integrated on the cable 210 between the devices 220 and 230. In the example shown in FIG. 2B, the signal detector 160 assesses the two devices 220 and 230 when they get connected to the cable 210 at each end but does not know which end is connected. The signal detector 160 reports that one then both ends are connected without reporting which one is which. The example shown in FIG. 2B is referred to herein as undetermined. The signal detector 160 reports the connection status as no end up, one end up or two ends up. The health status may be reported as no ends up or one or two ends up with good connection or one or two ends up with an issue and an indication of the issue.

FIG. 2C shows a third example. In the example shown in FIG. 2C the signal detector 160 is integrated in the cable 210. However, unlike in FIG. 2B, the signal detector shown in FIG. 2C is able to establish which one of the devices 220, 230 are connected and not merely whether zero, one or two devices are connected, without specifying which device is or is not connected. This case is referred to as individualized.

The examples shown in FIGS. 2A-2C are illustrative of different scenarios. The examples described herein include options of having binary connection status vs full health status vs partial health status, integration on a device or cable, individualized or undetermined connection status and powering the detector from the cable depending on the type of connection and cabling.

Figure 3:
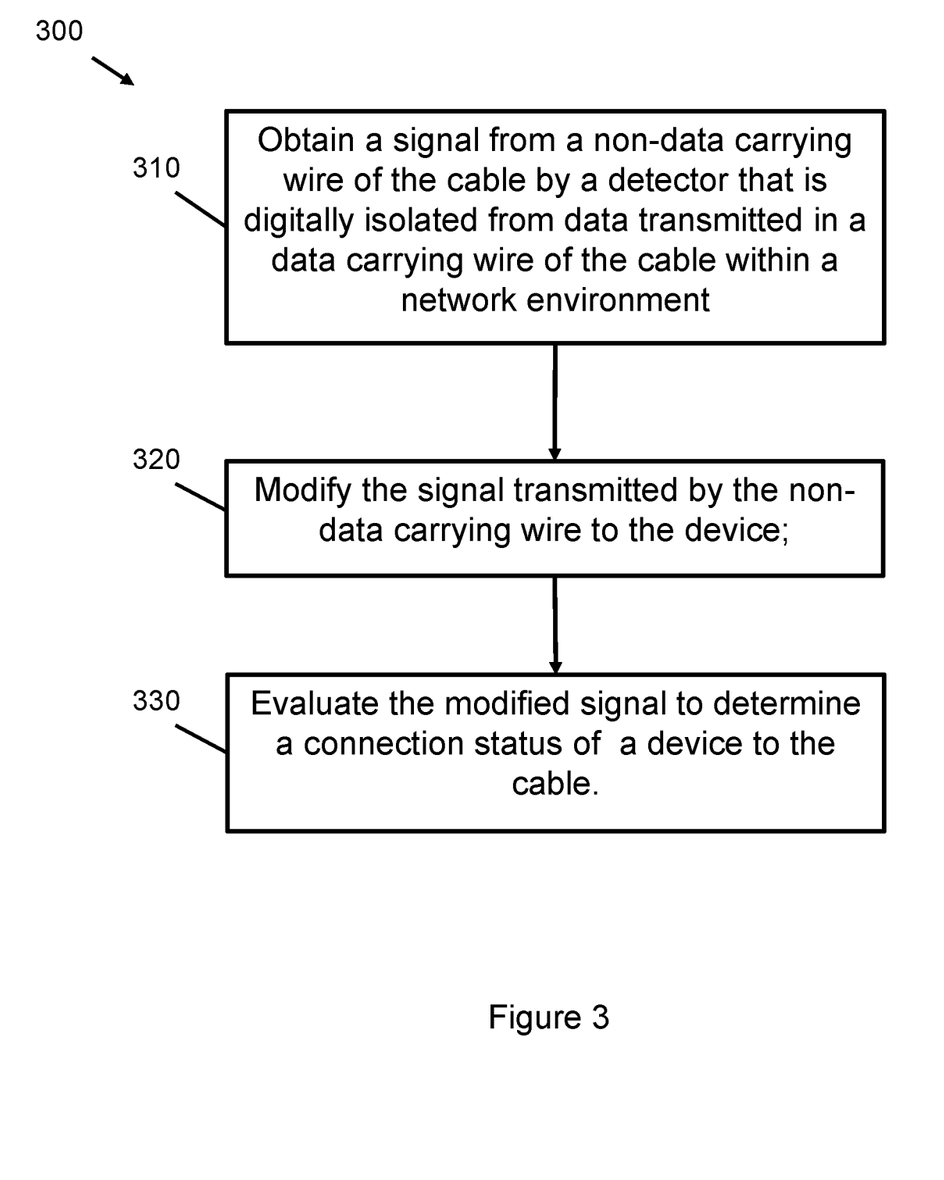
FIG. 3 is a block diagram of a method for determining a connection status of a device to a cable, according to an example.

FIG. 3 is a block diagram showing a method 300 for determining a connection status of a device to a cable within a network environment. The method 300 may be used in conjunction with the apparatus and examples described herein. In particular, the method 300 may be implemented on the signal detector 160 shown in FIG. 1.

At block 310, the method 300 comprises obtaining a signal from a non-data carrying wire of the cable by a detector that is digitally isolated from data transmitted in a data-carrying signal by the cable within a network environment. According to examples the cable, detector and network environment may be the cable 110, signal detector 160 and the network environment 130 shown in FIG. 1. In examples, obtaining the signal comprises obtaining a power signal from a power-carrying wire in the cable.

At block 320 the method 300 comprises modifying the signal transmitted by the non-data carrying wire of the cable to the device. The modification of the signal may be performed by a dedicated signal generator in the detector as previously described.

At block 330, the method 300 comprises evaluating the modified signal to determine a connection status of a device to the cable. The device may be a device within the network environment according to examples described herein. According to examples, evaluating the modified signal to determine a connection status of the device comprises comparing the modified signal to a pre-determined power characteristic associated to the device and determining a connection status on the basis of the comparison.

The method 300 may further comprise authenticating the detector to the device on the basis of the modified signal communicated between the detector and the device.

The methods and systems described herein allow the connection status and health status of a device in a network environment to be determined on the basis of a modified signal outside of a network environment. This allows an agent to remotely diagnose connection problems from outside of a network environment and, in particular, outside of a firewall or other form of protected network perimeter where visibility of network data is limited. In a complex network situation, even a trained technician may improperly connect devices or simply forget to connect devices. Once all the devices have been mounted, a distant supervisor may use the signal detector apparatus described herein to identify if an expected device is missing.

Advantageously, the detector apparatus described herein is lightweight and may be implemented in software and hardware, and is low powered, allowing the apparatus to be powered directly from a power signal in cabling. The signal detector apparatus is easily deployed in a wide range of scenarios including remote hardware monitoring in data centres and in the home in consumer electronics devices to identify faulty or improper connections.

In remote locker management, when a user has dropped a device in a locker the device may be remotely wiped or remotely fixed while inside the locker and before it is collected for repair or refurbishment. The device cables in lockers may be within a firewall while the decision to close such locker bins is managed from outside that firewall. As such the signal detector apparatus described herein may be used to determine a connection status of a device within a locker, thereby assisting an engineer located remotely from the locker.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

Figure 4:
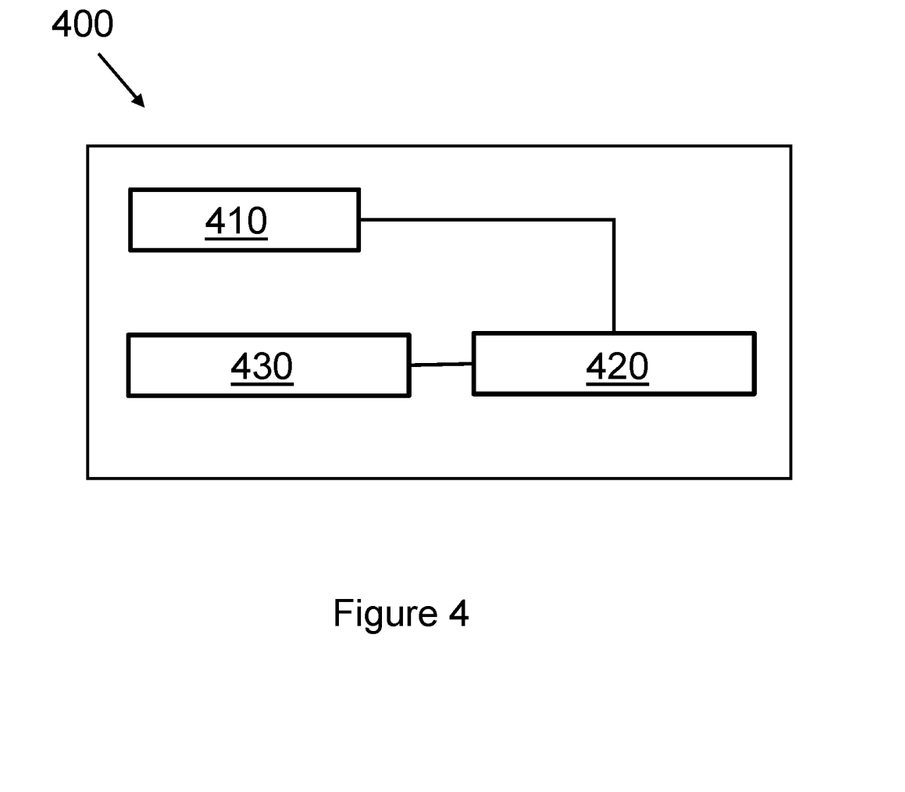
FIG. 4 is a schematic diagram showing a processor and memory, according to an example.

For example, the instructions may be provided on a non-transitory computer readable storage medium encoded with instructions, executable by a processor. FIG. 4 shows an example of a processor 410 associated with a memory 420. The memory 420 comprises computer readable instructions 430 which are executable by the processor 410.

The instructions 430 cause the processor to receive a signal transmitted by a non-data carrying wire of a cable comprising at least one data carrying wire and at least one non-data carrying wire, by a detector that is digitally isolated from data transmitted by a data carrying wire of the cable within a network environment, modify the signal transmitted by the non-data carrying wire, and determine a connection status of a device within the network environment to the cable on the basis of the modified signal.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for determining a connection status of a device within a firewalled network environment, the device coupled to a cable that extends outside the firewalled network environment, the cable comprising one or more data carrying wires and one or more non-data carrying wires, the method comprising:
   detecting, by a detector positioned outside the firewalled network environment, a signal transmitted from a device inside the firewalled network environment, wherein the signal is detected on a non-data carrying wire of the cable by the detector that is digitally isolated from data transmitted in a data carrying wire of the cable;
   generating a modified signal based on the detected signal;
   transmitting the modified signal on the non-data carrying wire; and
   evaluating the modified signal to determine the connection status of the device to the cable within the firewalled network environment.

2. The method of claim 1, wherein the connection status comprises a binary value indicative of the connection or non-connection of the device to the cable.

3. The method of claim 1, wherein at least one of the non-data carrying wires is a power-carrying wire.

4. The method of claim 3, wherein the detecting the signal comprises obtaining a power signal from the at least one power-carrying wire in the cable.

5. The method of claim 4, wherein the evaluating the modified signal to determine a connection status of the device comprises:
   comparing the modified signal to a pre-determined power characteristic associated to the device; and
   determining the connection status on the basis of the comparison.

6. The method of claim 4, further comprising powering the detector on the basis of the power signal obtained from the at least one power-carrying wire in the cable.

7. The method of claim 1, further comprising authenticating the detector to the device on the basis of the modified signal communicated between the detector and the device.

8. The method of claim 1, further comprising evaluating the modified signal to determine a connection status of a further device to the cable.

9. The method of claim 8, further comprising generating a health status of the device or the further device on the basis of the modified signal.

10. A signal detector for analysing a connection status of a device within a firewalled network environment, the device coupled to a cable that extends outside the firewalled network environment, the cable comprising a data carrying wire and a non-data carrying wire, the signal detector comprising:
    a detection module positioned outside the firewalled network environment to extract a signal transmitted from the device inside the firewalled network environment, wherein the signal is detected on the non-data carrying wire of the cable, wherein the detection module is digitally isolated from data transmitted in the data carrying wire of the cable;
    a signal generator communicatively coupled to the detection module to
       generate a modified signal based on the signal extracted by the detection module; and
       transmit the modified signal in the non-data carrying wire of the cable; and
    a signal processor, communicatively coupled to the detection module, to evaluate the modified signal to determine a connection status at a connection interface of the device to the cable within the firewalled network environment.

11. The signal detector of claim 10, comprising an authentication module to authenticate the signal detector to the device on the basis of the modified signal communicated between the signal detector and device.

12. The signal detector of claim 10, wherein the connection interface is a Thunderbolt interface, a Display port, a High-Definition Multimedia Interface (HDMI), a direct current (DC)-in barrel or a Gigabit Ethernet port.

13. A non-transitory machine-readable storage medium encoded with instructions executable by a processor to:
    receive, by a detector positioned outside a firewalled network environment, a signal transmitted from a device inside the firewalled network environment, wherein the signal is received on a non-data carrying wire of a cable that extends from the device inside the firewalled network environment to the detector positioned outside the firewalled network environment, the cable comprising at least one data carrying wire and the one non-data carrying wire, wherein the detector is digitally isolated from data transmitted by the at least one data carrying wire of the cable;
    modify the signal transmitted from the device on at least one non-data carrying wire; and
    determine a connection status of the device within the firewalled network environment to the cable on the basis of the modified signal.

* * * * *